(12) United States Patent
Smith

(10) Patent No.: US 6,561,282 B2
(45) Date of Patent: May 13, 2003

(54) AERATION MACHINE

(75) Inventor: Duncan Andrew Smith, Stafford (GB)

(73) Assignee: The Toro Company, Minneapolis, MN (US)

( * ) Notice: Subject to any disclaimer, the term of this patent is extended or adjusted under 35 U.S.C. 154(b) by 0 days.

(21) Appl. No.: 09/867,268

(22) Filed: May 29, 2001

(65) Prior Publication Data

US 2002/0043376 A1 Apr. 18, 2002

Related U.S. Application Data

(63) Continuation of application No. 09/231,340, filed on Jan. 13, 1999, now abandoned.

(30) Foreign Application Priority Data

Jan. 14, 1998 (GB) ................................................ 9800626

(51) Int. Cl.[7] .............................................. A01B 45/02
(52) U.S. Cl. ........................... 172/21; 172/95; 172/101; 172/93
(58) Field of Search ............................ 172/21, 22, 95, 172/101, 125, 93, 94; 403/225, 226, 227, 228

(56) References Cited

U.S. PATENT DOCUMENTS

| | | | | |
|---|---|---|---|---|
| 2,712,742 A | * | 7/1955 | Neidhart | |
| 3,601,424 A | * | 8/1971 | Badland | |
| 3,687,479 A | * | 8/1972 | Kober | |
| 3,783,639 A | * | 1/1974 | Goodman et al. | |
| 3,837,610 A | * | 9/1974 | Ewers | |
| 3,905,596 A | * | 9/1975 | Barber | |
| 4,632,189 A | * | 12/1986 | Rizzo | |
| 5,207,278 A | * | 5/1993 | Hatlen | |
| 5,469,922 A | * | 11/1995 | Bjorge | |
| 5,591,083 A | * | 1/1997 | Kirschey | |
| 5,641,025 A | * | 6/1997 | Kawaguchi | |
| 5,797,458 A | * | 8/1998 | Simon et al. | |
| 5,810,092 A | * | 9/1998 | Selvatici | |
| 5,988,290 A | * | 11/1999 | Banks | |
| 6,003,613 A | * | 12/1999 | Reincke | |
| 6,041,869 A | * | 3/2000 | Lewis et al. | |

FOREIGN PATENT DOCUMENTS

AU          710970       *    5/1997

OTHER PUBLICATIONS

Sketch of TM 1500 aerating machine.

* cited by examiner

Primary Examiner—Victor Batson
(74) Attorney, Agent, or Firm—James W. Miller

(57) ABSTRACT

An aeration machine 10 comprising a drive mechanism 16 connected to sets of tines 18 by a vibration absorbing linkage arrangement 34. The arrangement 34 enables the tines 18 to remain vertical when extending into the ground thereby avoiding elongation of the holes formed thereby. The aeration machine includes a linkage arrangement including a vibration absorbing member. The vibration absorbing member comprises a first part located at least partially within a hollow housing and is held within the hollow housing by a plurality of resilient members.

20 Claims, 5 Drawing Sheets

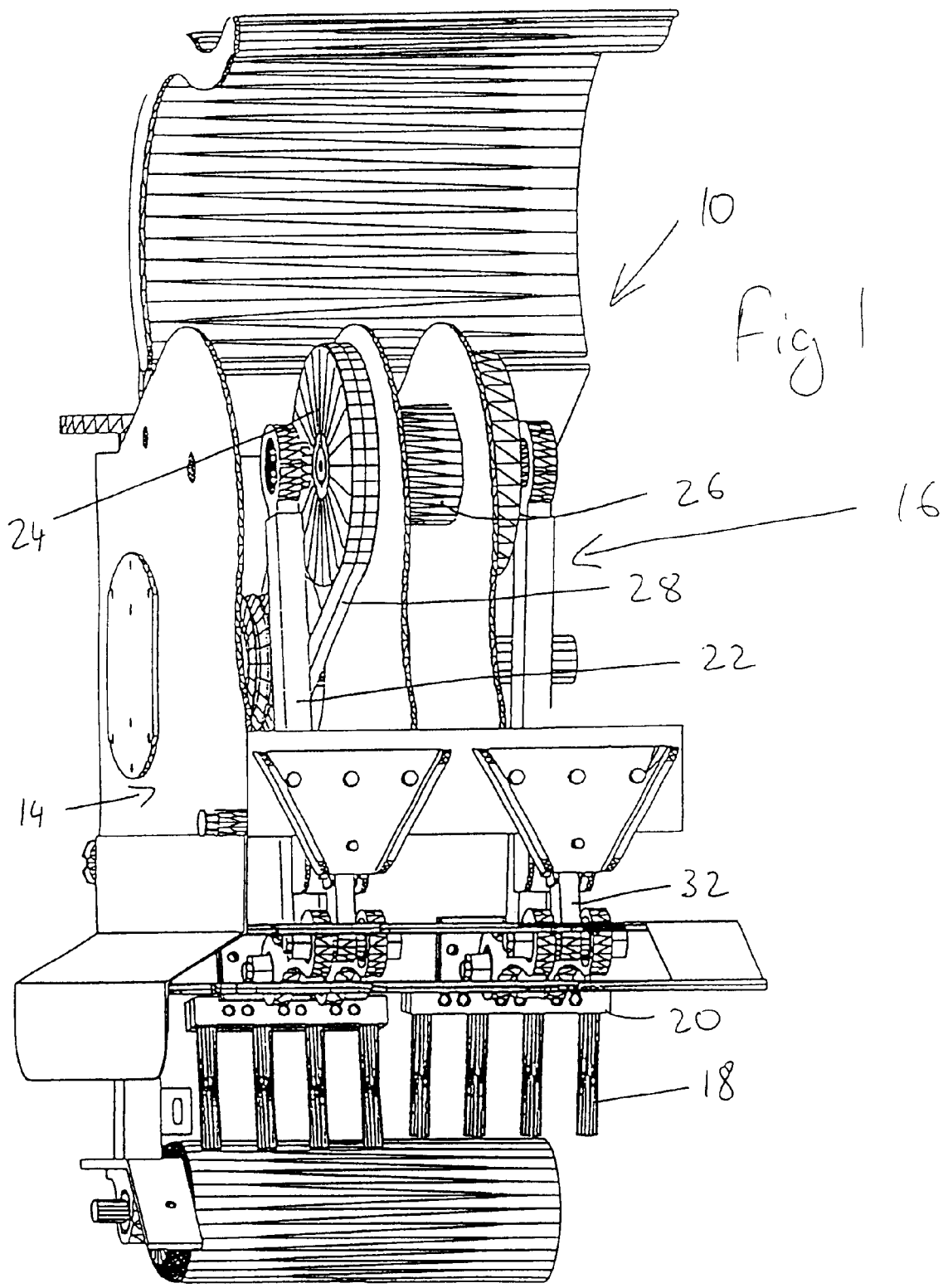

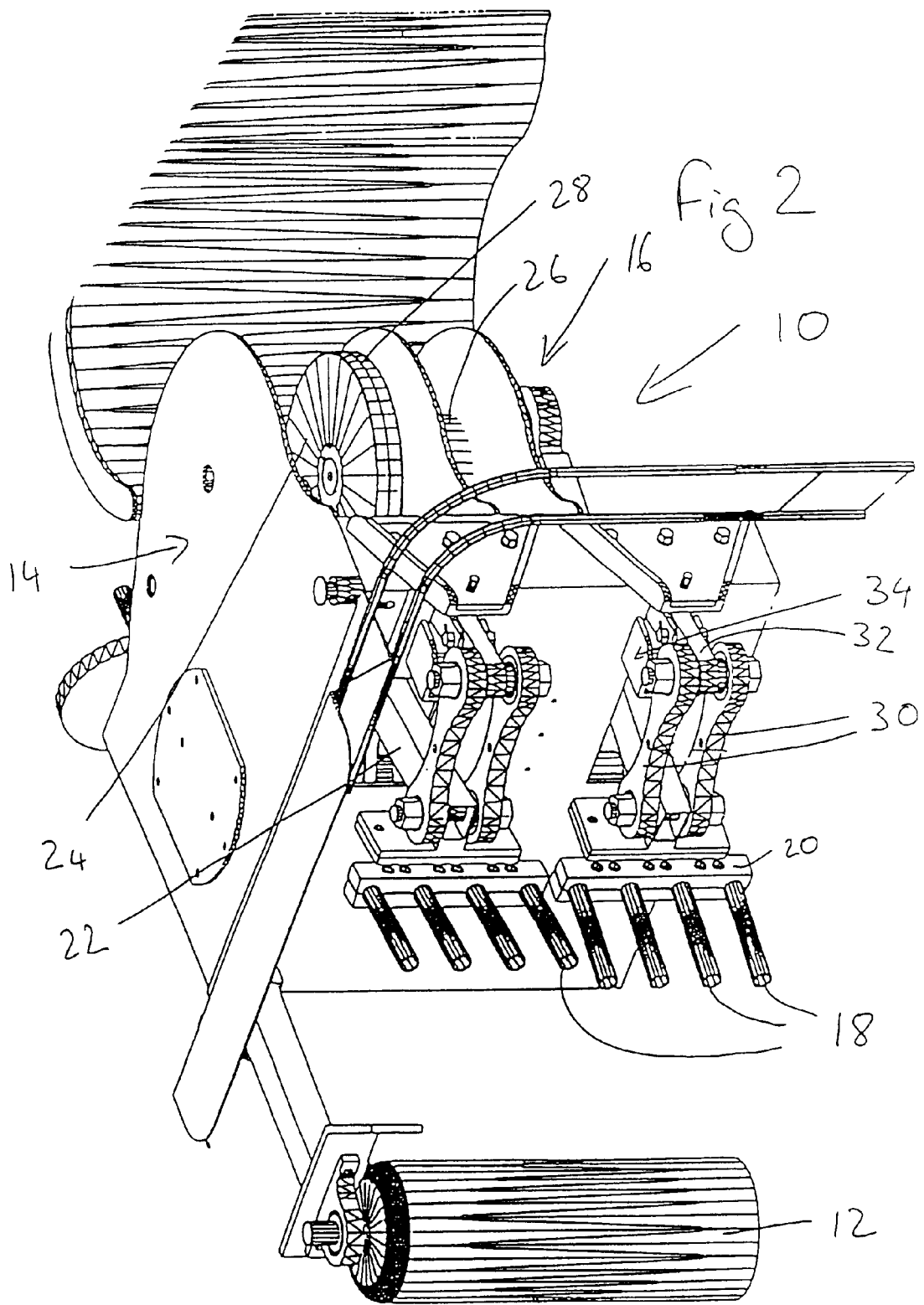

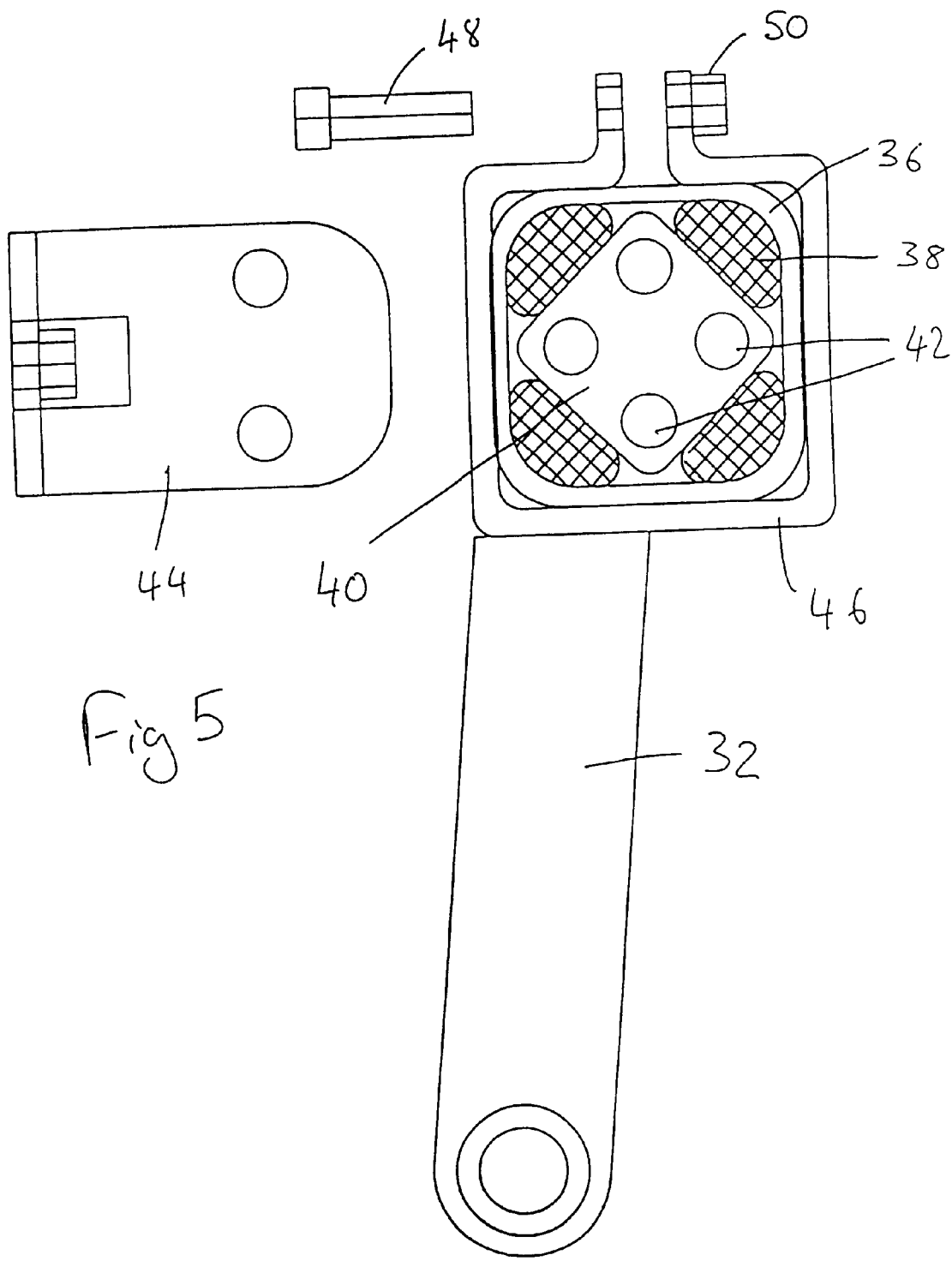

AERATION MACHINE

This is a continuation of application Ser. No. 09/231,340, filed Jan. 13, 1999, now abandoned.

This invention concerns improvements in or relating to aeration machines.

Aeration machines are used to aerate turf for example on golf greens, cricker squares or other sports pitches or leisure areas. They usually comprise a plurality of tines which are rapidly movable into and out of the ground as the machine moves along. The tines may be solid, or for instance hollow to remove cores of turf. Problems can be encountered with such machines in avoiding wear on the machine, elongation of round holes, and/or tearing of the ground as the machine moves whilst the tines are entering and leaving the ground. It is desirable that longitudinal movement of the dies relative to the ground, only occurs when the tines are wholly clear of the ground.

According to the present invention there is provided an aeration machine, the machine comprising one or more tines selectively movable into and out of the ground, and a linkage arrangement between the machine and the tines which arrangement is substantially vibration absorbing and permits the tines to move in substantially only a vertical direction when any part of the tines extends into the ground.

The linkage may comprise a vibration absorbing member. The vibration absorbing member may comprise first and second parts, with the first part located at least partially within the second part and held therein by one or more resilient members. The resilient member may comprise one or more pieces of a resilient material The resilient material is preferably self-camping and may comprise rubber.

The second part may comprise a hollow housing with the first part held therein by a plurality of pieces of resilient material The first part may be of generally square cross-section, and desirably a piece of material is provided along each side thereof. The second part may be of square cross-section, and in a rest condition the first and second parts may be oriented at substantially 45° relative to each other.

"The second part is preferably mountable to the tines and the first part mountable to the remainder of the machine.

The second part is preferably mounted to the tines by a pivotal arrangement, and the arrangement may comprise a first member extending from the vibration absorbing member and which pivotally mounts a linkage member, which linkage member pivotally connects to the tines."

The tines may be, vertically drivable by a link member pivotally mounted off centre on a drive wheel. The link member preferably pivotally mounts the linkage.

An embodiment of the present invention will now be described by way of example only with reference to the accompanying drawings, in which:

FIG. 1 is a diagrammatic rear view of an aeration machine according to the present invention;

FIG. 2 is a perspective view from beneath and behind of the machine of FIG. 1;

Figure 4:
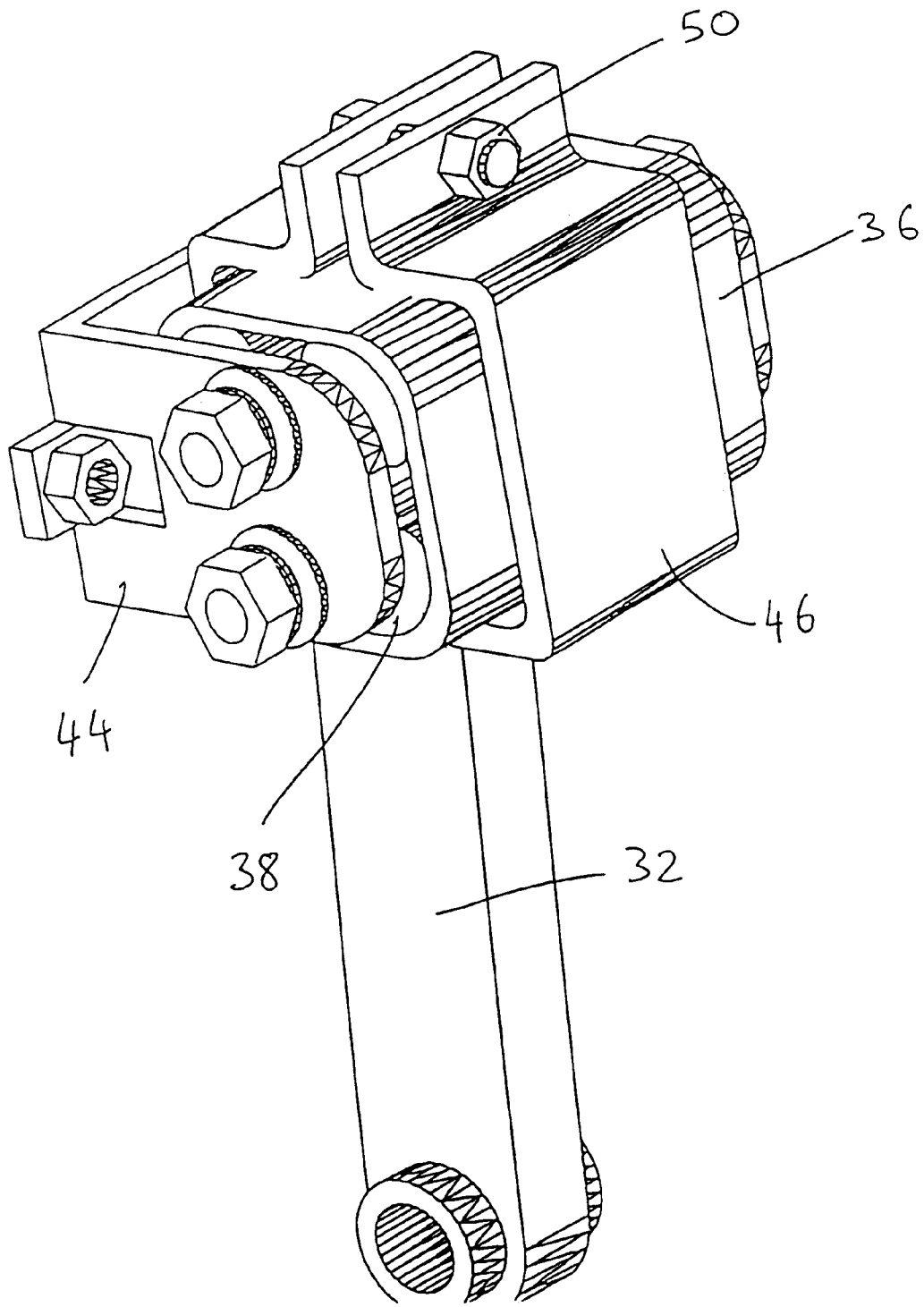

FIGS. 3A to D show sequential diagrammatic side views of the part of the machine of FIG. 1 in use;

FIG. 4 is a diagrammatic perspective view of part of the apparatus of FIG. 1; and FIG. 5 is a diagrammatic exploded cross-sectional view of the components of FIG. 4.

The drawings show an aeration machine 10 suitable for aerating golf greens and the like. The machine comprises a front roller 12 mounted on a body 14 which contains a drive mechanism 16 connected to two sets of four tines 18. The tines 18 in each set are rigidly connected, and each set is arranged to enter the ground at a different time relative to the other set. The machine 10 is drivable behind a tractor (not shown) in a conventional manner, with the tractor providing the drive for the machine 10.

Considering the drive mechanism 16 in more detail, is will be described for one set of tines 18 but an identical arrangement is provided for each set. The tines 18 are removably mounted on a bracket 20 which is mounted on the free end of an elongate link member 22. The other end of the link member 20 is pivotally mounted off centre on a drive wheel 24. A drive wheel 24 is provided for each set of tines 18 and mounted on an axial 26. A drive belt 28 extends around a one of the wheels 24 and also around a further drive wheel (not shown) which connects to a towing tractor.

The first end of the link member 22 pivotally mounts a linkage member 30 at one end thereof. The other end of the member 30 pivotally links a relatively short connecting bar 32. The other end of the bar 32 connects to a vibration absorbing linkage 34 which is mounted to the frame of the machine 10.

The linkage 34 comprises a length of tube 36 of square section, but with rounded corners. A piece of rubber 38 is located extending along each corner of the tube 36. A square section block 40 is located within the tube 36 and held in position by the pieces 38. The block 40 is orientated at substantially 45° to the tube 36. Threaded holes 42 are provided in the block 40 to permit mounting thereof to a U-shaped bracket 44 mountable on the frame of the machine 10. Mounted on the free end of the bar 32 is a square section bracket 46. A gap is provided In the upper side of the bracket 46 and has upturned flanges with aligned holes through which a bolt 48 extends engageable with a nut 50. The bracket 46 is locatable around the tube 36, and can be rigidly mounted thereon by tightening the nut 50 on the bolt 48.

Figure 3D:
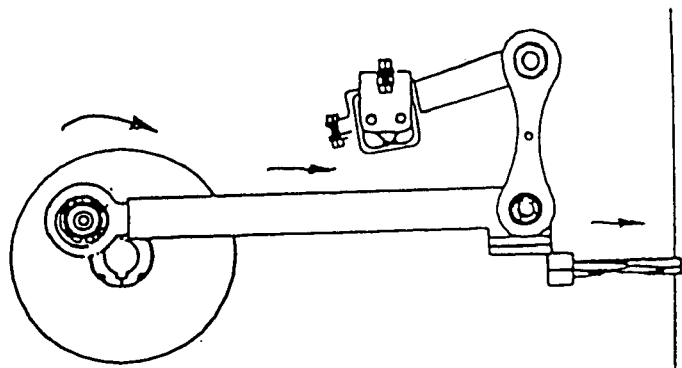
Figure 3C:
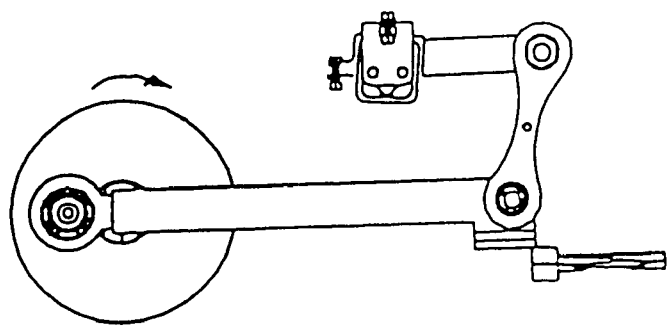
Figure 3B:
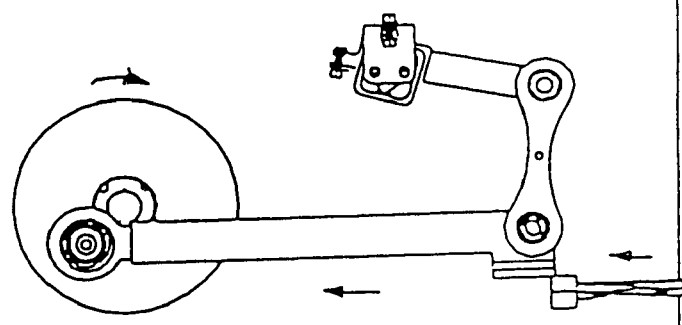
Figure 3A:
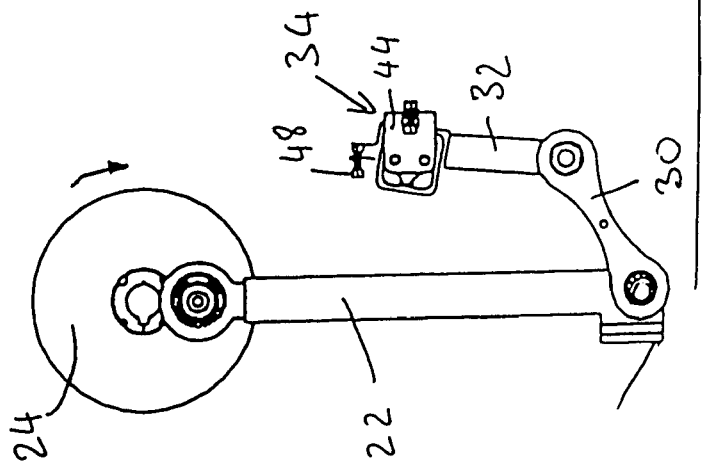

FIGS. 3A to 3D show operation of the machine 10 and particularly the drive mechanism 16. In FIG. 3A as the link member 22 reaches its lowest position the tine 18 is driven fully into the ground. As the link member 22 rises (FIG. 3B) the tine 18 rises. At the same time the machine 10 will almost certainly be moving forwards i.e. to the right as shown in FIGS. 3A to D. Rather than the tine 18 being moved sideways, the relative spacing between the tine 18 and the axis of the wheel 24 is taken up by the linkage 34 connecting via the bar 32 and linkage member 30. The resilience of the rubber pieces 38 permits the bar 32 and hence tube 36 to rotate relative to the block 40.

When the tine 18 is fully out of the ground (FIG. 3C) the resilience of the rubber pieces 38 allows the tube 36 and hence bar 32 to rotate back to a relaxed condition. In FIG. 3D as the tine 18 re-enters the ground, the linkage 34 permits the tube 36 and hence the bar 32 to rotate to the right as shown in the drawings which compensates for the upper end of the member 22 being to the right hand side of the axis of the wheel 24.

There is thus described an aeration machine and particularly a drive mechanism and linkage therefor which provides considerable advantages. The linkage 34 allows the tines 18 to remain vertical during use and therefore avoid ripping the ground or elongating a round hole. The linkage 34 also absorbs vibration. This reduces ware of components and also the noise of operation. The arrangement is of relatively straightforward construction and can thus be inexpensively and robustly manufactured.

Various modifications may be made without departing from the scope of the invention. For example, a different linking arrangement could be provided between the linkage and the tines. A different vertical drive arrangement could also be provided.

Whilst endeavouring in the foregoing specification to draws attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. An aeration machine, the machine comprising one or more tines selectively movable into and out of the ground, and a linkage arrangement between the machine and the tines which arrangement is substantially vibration absorbing and permits the tines to move in substantially only a vertical direction when any part of the tines extends into the ground, wherein the linkage arrangement includes a vibration absorbing member, wherein the vibration absorbing member comprises first and second parts, wherein the second part comprises a hollow housing, and wherein the first part is located at least partially within the hollow housing and is held within the hollow housing by a plurality of resilient members extending between the first part and the hollow housing.

2. An aeration machine according to claim 1, wherein the second part is mountable to the tines.

3. An aeration machine according to claim 2, wherein the first part is mountable to the machine.

4. An aeration machine according to claim 2, wherein the second part is mounted to the tines by a pivotal arrangement.

5. An aeration machine according to claim 4, wherein the arrangement comprises a first member extending from the vibration absorbing member and which pivotally mounts a linkage member.

6. An aeration machine according to claim 5, wherein the linkage member pivotally connects to the tines.

7. An aeration machine according to claim 1, wherein the first part may be of generally square cross-section.

8. An aeration machine according to claim 7, wherein a resilient member is provided along each side of the first part.

9. An aeration machine according to claim 8, wherein the second part is of square cross-section.

10. An aeration machine according to claim 9, wherein in a rest condition the first and second parts may be oriented at substantially 45° relative to each other.

11. An aeration machine according to claim 1, wherein each resilient member comprises one or more pieces of a resilient material.

12. An aeration machine according to claim 1, wherein the resilient material is self-damping.

13. An aeration machine according to claim 1, wherein the resilient material comprises rubber.

14. An aeration machine according to claim 1, wherein the tines are vertically drivable by a link member pivotally mounted off centre on a drive wheel.

15. An aeration machine according to claim 14, wherein the link member pivotally mounts the linkage arrangement.

16. An aeration machine according to claim 1, wherein the linkage arrangement includes a pivotal connecting member operatively connecting the tines and the vibration absorbing member, and wherein one of the first and second parts of the vibration absorbing member forms a pivot for pivotally journaling the pivotal connecting member to the machine.

17. An aeration machine according to claim 16, wherein the first and second parts have polygonal cross-sectional shapes.

18. An aeration machine, the machine comprising one or more tines selectively movable into and out of the ground, and a linkage arrangement between the machine and the tines which arrangement is substantially vibration absorbing and permits the tines to move in substantially only a vertical direction when any part of the tines extends into the ground, wherein the linkage arrangement includes a vibration absorbing member, wherein the vibration absorbing member comprises first and second parts, wherein the first part is located at least partially within the second part and is held within the second part by a plurality of resilient members extending between the first and second parts, and wherein the vibration absorbing member comprising the first and second parts and the resilient members form a self-contained unit which can be installed and removed from the linkage arrangement without having to disassemble the first part from the second part or remove the resilient members from between the first and second parts.

19. An aeration machine according to claim 18, wherein the hollow housing has a polygonal cross-sectional shape, and wherein the clamp comprises a bracket fixed on the connecting member with the bracket having a cross-sectional shape adapted to mate with and fit around the polygonal cross-sectional shape of the hollow housing, the bracket being split along one side with upturned flanges having aligned holes through which a bolt may be inserted, the bracket clamping around the hollow housing when a nut on one end of the bolt is tightened to compress the flanges and clamp the bracket around the hollow housing.

20. An aeration machine, the machine comprising one or more tines selectively movable into and out of the ground, and a linkage arrangement between the machine and the tines which arrangement is substantially vibration absorbing, wherein the linkage arrangement includes a pivotal connecting member operatively connected at one end to the tines and operatively connected at the other end to a vibration absorbing member, wherein the vibration absorbing member comprises a hollow housing having a central block and a plurality of resilient members located within the housing, wherein the central block is concentrically located at least partially within the hollow housing and the resilient members are between the central block and the hollow housing to resist relative rotary motion between the hollow housing and the central block, wherein the hollow housing, central block and resilient members form a self-contained unit in which the central block is held within and prevented from falling out of the hollow housing by the resilient members, wherein the machine includes a pair of opposed fixed flanges between which the vibration absorbing member may be placed with the vibration absorbing member being fixed to the machine during operation of the aerator by at least one securing member that fixes the central block to the flanges, and wherein the connecting member carries a clamp that is configured to fit and clamp around the hollow housing to releasably secure the hollow housing of the vibration absorbing member to the connecting member such that rotary motion of the connecting member is resisted by deformation of the resilient members as the hollow housing rotates relative to the central block, whereby the vibration absorbing member can be installed and removed as a unit from the machine and the connecting member by releasing the clamp to free the hollow housing from the connecting member and by releasing each securing member to free the central block from the flanges.

* * * * *

UNITED STATES PATENT AND TRADEMARK OFFICE
CERTIFICATE OF CORRECTION

PATENT NO. : 6,561,282 B2  Page 1 of 1
DATED : May 13, 2003
INVENTOR(S) : Duncan Andrew Smith It is certified that error appears in the above-identified patent and that said Letters Patent is hereby corrected as shown below:

<u>Column 4,</u>
Line 18, change "claim 18" to -- claim 20 --

Signed and Sealed this

Twentieth Day of January, 2004

JON W. DUDAS
*Acting Director of the United States Patent and Trademark Office*